(12) United States Patent
De Haan et al.

(10) Patent No.: US 7,010,039 B2
(45) Date of Patent: Mar. 7, 2006

(54) MOTION ESTIMATOR FOR REDUCED HALOS IN MC UP-CONVERSION

(75) Inventors: Gerard De Haan, Eindhoven (NL); Mark Jozef Willem Mertens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 768 days.

(21) Appl. No.: 09/855,628

(22) Filed: May 15, 2001

(65) Prior Publication Data

US 2003/0206246 A1  Nov. 6, 2003

(30) Foreign Application Priority Data

May 18, 2000  (EP) ................................. 00201752
Feb. 16, 2001  (EP) ................................. 01200560

(51) Int. Cl.
    *H01N 7/12* (2006.01)
(52) U.S. Cl. ............................................. 375/240.16
(58) Field of Classification Search ................ 348/470, 348/416, 390, 384, 400, 407, 409, 411, 413, 348/424, 415; 375/240.16, 240.14, 240.13, 375/240.26, 240.17, 240.12, 240.29; 382/236, 382/307
    See application file for complete search history.

(56) References Cited

U.S. PATENT DOCUMENTS

| | | | |
|---|---|---|---|
| 4,890,160 A | 12/1989 | Thomas | ...................... 358/105 |
| 6,154,519 A * | 11/2000 | Florent et al. | ................. 378/62 |
| 6,192,079 B1 * | 2/2001 | Sharma et al. | ......... 375/240.16 |
| 6,195,389 B1 * | 2/2001 | Rodriguez et al. | ...... 375/240.16 |
| 6,480,615 B1 * | 11/2002 | Sun et al. | .................... 382/103 |
| 6,594,313 B1 * | 7/2003 | Hazra et al. | ........... 375/240.16 |
| 2002/0186889 A1 * | 12/2002 | De Haan et al. | ............ 382/236 |

FOREIGN PATENT DOCUMENTS

WO  WO 00/11863  3/2000

* cited by examiner

*Primary Examiner*—Vu Le
*Assistant Examiner*—Behrooz Senfi
(74) *Attorney, Agent, or Firm*—Edward W. Goodman

(57) ABSTRACT

An apparatus for detecting motion at a temporal intermediate position between a previous image and a next image has optimizing means (1) for optimizing a criterion function for candidate vectors, whereby the criterion function depends on data from both the previous and the next image. The motion is detected at the temporal intermediate position in non-covering and in non-uncovering areas. The apparatus according to the invention has means for detecting covering and uncovering areas (2) and has its optimizing means being arranged to carry out the optimizing at the temporal position of the next image in covering areas and at the temporal position of the previous image in uncovering areas.

25 Claims, 5 Drawing Sheets

MOTION ESTIMATOR FOR REDUCED HALOS IN MC UP-CONVERSION

The invention relates to a method for detecting motion at a temporal intermediate position between previous and next images, in which a criterion function for candidate vectors is optimised, said function depending on data from both previous and next images and in which the optimising is carried out at the temporal intermediate position in non-covering and non-uncovering areas.

The basic observation from which the current invention results is that an estimator estimating motion between two successive pictures from a video sequence, cannot perform well in areas where covering or uncovering occurs, as it is typical for these areas that the information only occurs in either of the two impages. Block matchers, as a consequence will always find large match errors even for the correct vector.

The invention has the object to remove the above-cited problems, in general problems in calculating vector fields from previous and/or next images.

According to the invention this object is achieved in that the optimising is carried out at the temporal position of the next image in covering areas and at the temporal position of the previous image in uncovering areas.

Furthermore, the invention relates to an apparatus for detecting motion between previous and next images, comprising means for optimising a criterion function for candidate vectors, said function depending on data from both previous and next images and in which the optimising is carried out at the temporal intermediate position in non-covering and uncovering areas, wherein means for detection covering or uncovering areas are provided and that the optimising is carried out at the temporal position of the next image in covering areas and at the temporal position of the previous image in uncovering areas. Embodiments of the method and apparatus according to the invention are specified in sub-claims.

The invention will be described in more detail with reference to the attached drawings.

The invention can be applied in various technical fields. Examples are: picture rate conversion, where an improved vector field according to the invention results in a more pleasing, artefact free video stream. Typical devices for this application are TV and PC.

3D disparity analysis, where images are generated by a rolling camera or from a rolling scene.

motion based video compression where an improved vector field according to the invention results in higher quality predictions and therefore in higher compression ratio or improved picture quality. An example is compression in MPEG.

motion based image analyses where an improved vector field according to the invention results in a more faithful extraction of objects and hence in an easier post-processing. Examples are: security camera video analyses, video special effects and traffic analyses.

picture enhancement in television techniques e.g. avoidance of blurring of background.

scientific application, where an improved vector field according to the invention results in a better data analyses. Examples are satellite photos of clouds and oceanography.

It is recognised, that in the case of covering all information in the current picture is present in the previous picture, while in the event of uncovering the next picture(s), while in an area of uncovering, the current picture contains all information of the previous one (locally around the uncovering area). Ergo, by modifying the match error calculation, controlled by a covering/uncovering detector, e.g. the one disclosed in WO 00/11863 from matching the current picture with the motion compensated previous picture (covering) to matching the previous picture with the motion compensated current picture (uncovering), any ambiguity in the estimator can be prevented. This is expected to yield more accurate and consistent vector fields and therefor reduced halo. This modification shall be elaborated a later part of the specification.

As a side effect of this dynamically changing match calculation, the resulting unambiguous vector field is no longer valid for one moment in time, let alone the moment where the upconversion takes place, but this 'validity moment' changes depending on the area under consideration being a covering, uncovering or simple rigidly moving area. This effect can be eliminated with a second ingredient of this disclosure, described in a later part of the specification.

Figure 1:
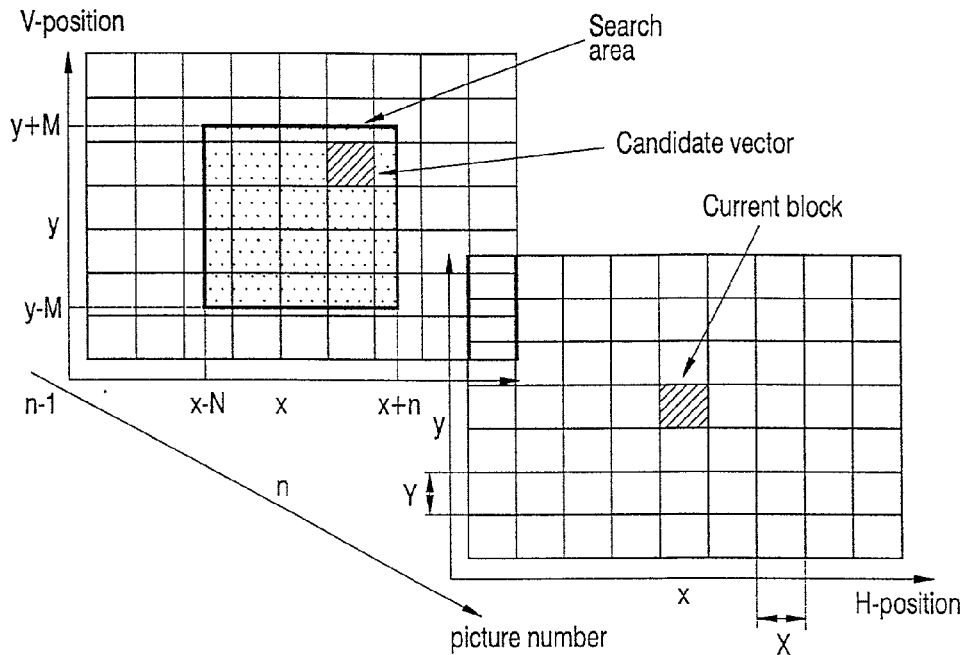
FIG. 1 illustrates an example of a method for estimating motion.

Now the improved motion vector calculation using a full-search block-matching motion estimator algorithm to calculate the motion vectors, will be elucidated with reference to FIG. 1. This algorithm is not a very cost-effective approach to the motion estimation problem, but the more effective one. The same principle is described in the article "True Motion Estimation with 3-D Recursive Search Block-Matching" of G. de Haan, P. W. A. C. Biezen, H. Huygen and O. A. Ojo, published in IEEE Tr. on Circuits and Systems for Video Technology, vol. 3, October 1993, pages 368–388 and the article "Sub-Pixel motion estimation with 3-D recursive search block-matching" of G. de Haan and P. W. A. C. Biezen published in Signal Processing: Image Communication 6 (1994) pages 220–239.

In block-matching motion estimation algorithms, a displacement vector is assigned to the centre $$X = \begin{pmatrix} X_x \\ X_y \end{pmatrix}$$

of a block of pixels $B(\vec{X})$ in the current picture n by searching for a similar block within a search area $SA(\vec{X})$, also centred at $\vec{X}$, but in the previous picture n−1. The similar block has a centre, which is shifted with respect to $\vec{X}$ over the displacement vector $\vec{D}(\vec{X},n)$. To find $\vec{D}(\vec{X},n)$, a number of candidate vectors $\vec{C}$ are evaluated by applying an error measure $(\vec{C},\vec{X},n)$ to quantify block similarity. More formally, $CS^{max}$ is defined as the set of candidates $\vec{C}$, describing all possible (usually integer) displacements with respect to $\vec{X}$ within the search area $SA(\vec{X})$ in the previous image:

$$CS^{max} = \{\vec{C} \mid -N \leq C_x \leq N, -M \leq C_y \leq M\} \quad (1)$$

where N and M are constants limiting $SA(\vec{X})$. A block $B(\vec{X})$ centred at $\vec{X}$ and of size X by Y, consisting of pixel positions $$\vec{x} = \begin{pmatrix} x \\ y \end{pmatrix}$$

in the present picture n, is defined:

$$B(\vec{X}) = \{\vec{x} \mid X_x - X/2 \leq x \leq X_x + X/2 \; X_y - Y/2 \leq y \leq X_y + Y/2\} \quad (2)$$

The displacement vector $\vec{D}(\vec{X},n)$ resulting from the block-matching process, is a candidate vector $\vec{C}$ which yields the minimum value of an error function $(\vec{C},\vec{X},n)$:

$$\vec{D}(\vec{X},n) \in \{\vec{C} \in CS^{max} \mid \epsilon(\vec{C},\vec{X},n) \leq \epsilon(\vec{V},\vec{X},n) \forall \vec{V} \in CS^{max}\} \quad (3)$$

If, which is the common case, the vector $\vec{D}(\vec{x},n)$ with the smallest matching error is assigned to all pixel positions x in the block $B(\vec{X})$:

$$\forall \vec{x} \in B(\vec{X}): \vec{D}(\vec{x},n) = \vec{D}(\vec{x},n) \quad (4)$$

rather than to the centre pixel only, a large reduction of the number of computations is achieved.

As an implication, consecutive blocks $(B(\vec{X})$ are not overlapping. The error value for a given candidate vector $\vec{C}$ is a function of the luminance values of the pixels in the current block and those of the shifted block from a previous picture, summers over the block $(B(\vec{X})$. A common choice, which we too shall use, is the sum of the absolute differences (SAD):

$$\epsilon(\vec{C},\vec{X},n) = \Sigma_{\vec{x} \in B(\vec{x})} |F(\vec{x} - \alpha\vec{C}, n-1) - F(\vec{x} + (1-\alpha)\vec{C}, n)| \quad (5)$$

where $\alpha$ is a constant, $0 \leq \alpha \leq 1$, determining the temporal position between the two pictures, where the vector field has to be valid.

Figure 2:
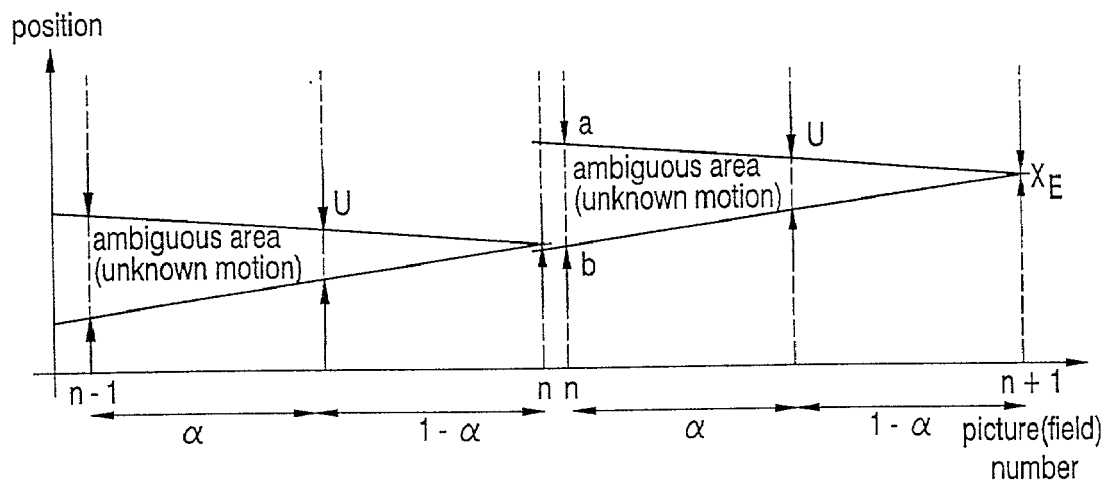
FIG. 2 illustrates an ambiguous area due to covering.

FIG. 2 shows more clearly what happens for all possible reference positions $0 \leq \alpha \leq 1$. Supposed that the upper line a corresponds to the position of the edge of the foreground object travelling through time. Then in the future picture we find the correct foreground or background velocities on either side of the velocity vector edge position $X_E$ (position where the motion vector displace a significant spatial change), but the more we move the reference position $\alpha$ towards the passed picture, the larger the ambiguity region becomes, in which it is impossible to find the correct vector by imaging. Since all candidate vectors will have a large SAD value, minimisation randomly selects a certain candidate which means that the resulting vector fields are almost impossible to correct.

Figure 3:
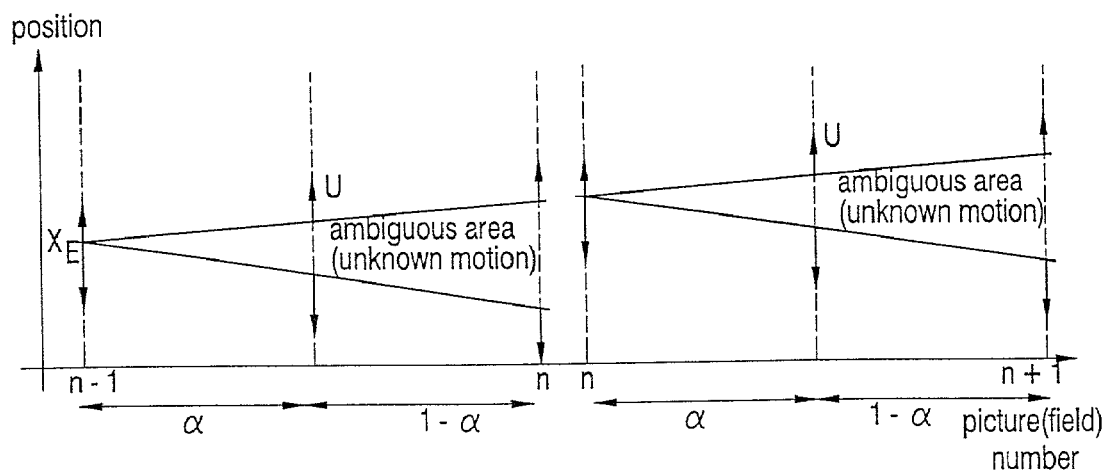
FIG. 3 illustrates an ambiguous area due to uncovering.

Similarly, from FIG. 3 we learn that for uncovering regions an unambiguous motion estimation results, if we put the reference position $\alpha$ equal to 0, in other words we project blocks from the future to the past. For rigid motion no errors occur if we put the reference position in the middle (for example $\alpha$ is 0.5). The decision whether an area is a covering or uncovering area could be done based upon the sign of the difference of the motion vectors' x-components taken from either side of the vector edge $X_E$ in the previously calculated vector field.

The invention is based on the insight that in the case of e.g. covering, all pixel blocks present in and around the occlusion area in the future picture can also be found in the past picture, however, in the past picture there are extra blocks, which no longer exist in the future picture, because they become covered. A natural position to put the reference position $\alpha$ for block matching is at the temporal position of the future picture, since then for all blocks in and around the occlusion area a correct motion vector can in principle be found.

The improvement proposed, results from the observation that in areas where covering occurs, correct motion vectors can only be estimated with an estimator using $\alpha=1$. Similarly, for uncovering only correct vectors are found with an estimator using $\alpha=0$.

Vector estimators calculating vectors for intermediate temporal instances have difficulties with both covering and uncovering, be it that their worst case area of ambiguity is smaller than for the extreme estimators. (The worst case ambiguity is least for the estimator applying $\alpha=0.5$). The FIGS. 2 and 3 illustrate the effect of $\alpha$ on the size of the ambiguous area.

The first step is improving the block matcher for covering and uncovering situations, regardless the required value of $\alpha$ for the interpolated picture results by changing equation 5 to:

$$\epsilon_c(\vec{C},\vec{X},n) = \Sigma \vec{x} \in B(\vec{x}) |F(\vec{x} - \vec{C}, n-1) - F(\vec{x}, n)| \quad (6)$$

in case an area of covering as indicated by the covering/uncovering detector, e.g. the one described in WO 00/11863 and to $$\epsilon_c(\vec{C},\vec{X},n) = \Sigma \vec{x} \in B(\vec{x}) |F(\vec{x}, n-1) - F(\vec{x} + \vec{C}, n)| \quad (7)$$

in the event of uncovering.

In non-occlusion areas we take e.g. $\alpha=0.5$ and project the blocks bidirectionally from both the past and future pictures to the reference block position, i.e. compare them at the temporal position interpolated picture. For covering blocks we take $\alpha=1$ and match a block in the future picture in its own position with a block fetched with the candidate motion vector from the past picture. In uncovering areas of the picture we take $\alpha=0$, in other words we matched the blocks in past picture with the blocks from the future picture.

There are a number of ways in which occlusion or more specific covering and uncovering regions can be detected.

The covering/uncovering detector may use a previous vector field, or a previous calculation (iteration) of the current vector field, or use methods based on evaluation of match errors calculated between neighbouring pictures.

A preferred covering/uncovering detector looks at the signs of the velocities. If e.g. to neighbouring velocities point towards each other we know that covering must occur. The other cases can be analysed accordingly and are summarised as follows $$v_U - v_D > \delta \text{(covering)}$$

$$v_U - v_D < -\delta \text{(uncovering)}$$

in which $v_U$ is the velocity edge $X_E$, $v_D$ is the velocity below the edge and 67 is a small constant to avoid noisy detections. This method is extremely robust since it does not rely on the specific numerical values of the vectors. One will always have a more or less correct vector value on either side of the edge and even if the values are incorrect their difference still could be correct. Secondly a large band around the predicted edge is "guarded" since the estimations for covering respectively uncovering behave like the classical estimation (equation 7) in foreground FG regions i.e. outside the ambiguity triangle. This provides robustness against position deviations of the edge $X_E$.

The benefit gained from switching α to 0 or 1, is that no incorrect vectors result from the minimisation, but the price to be paid is that the vectors obtained are not always in the correct block positions. E.g. the foreground FG edge (the block position where the vector changes from the background BG to the foreground FG velocity) is found at the position $X_E$, in stead of at its real position U (see FIGS. 2, and 3). This is because of the time moment of the matching was incorrect (e.g. α=0 in stead of e.g. α=0.5).

In fact the obtained vector field is not valid at any single time moment, but at three different time moments, depending on the position in the image, hence this method is called "tritemporal motion estimator". In general the vector field has to be retimed to the desired intermediate position (e.g. α=0.5). In the specific case of a sequence in which the foreground FG object is stationary and the background BG moves behind it, no retiming of the tritemporal vector field is necessary, since the foreground FG edge does not move ($X_E$=U). This happens often in film material where the cameraman tracks the main subject.

As a consequence of the proposed modification, there are no ambiguities for the motion estimator, although we have sacrificed the correct temporal instance where the vector field is valid. This shall be detailed in the following subsection.

In a second step of the algorithm, the retimer, the time error is corrected. To this end, the vector field is 'projected' to the desired temporal instance, i.e. projected back in time for covering:

$$D^*(\vec{x}, n-1+\alpha) = D(\vec{x} + (1-\alpha)\vec{D}(\vec{x}, n), n) \quad (8)$$

and forward for uncovering:

$$D^*(\vec{x}, n-1+\alpha) = D(\vec{x} - \alpha\vec{D}(\vec{x}, n-1), n-1) \quad (9)$$

This projection reintroduces ambiguous areas, i.e. areas to which no vector is assigned. The origin of this ambiguity is that with one estimate it is unknown whether the discontinuity has moved along the line 'a', or along the line 'b' in FIG. 2, hence it is not trivial that the vector taken from e.g. position $\vec{x}$ above the discontinuity is the background vector which should be put in this position in the upconversion vector field. With help of the previous vector field however, it is possible to judge with which of the two possible vectors the edge moves, and hence which is the background and which the foreground velocity.

The retimer performs the following actions, it determines where the retiming should occur. It looks for a velocity edge $\vec{x}_E$ and marks a sufficiently broad occlusion region around this edge. Second it calculates how much blocks exactly should be corrected, by rounding the foreground FG velocity to block precision. Third it determines which retimer correction action should be applied.

Furthermore the retimer determines the starting position $\vec{x}_A$ of the ambiguity area in the vector field at time n−1+α by projecting the foreground velocity from the vector edge $\vec{x}_E$ in the unambiguous vector field. A small refinement results if the position $\vec{x}_A$ of the edge in the intermediate vector field is not a result of shifting the estimates from one vector field, but is calculated as the weighted (with α) average of the positions in the current and previous vector field. The retimer then fills the space between $\vec{x}_A$ and $\vec{x}_E$ with either the foreground or background velocity, depending on the side of the foreground region (left or right of $\vec{x}_E$) and the sign of the foreground velocity. For this strategy to work, a robust foreground/background determination strategy is needed.

It turns out that there are 8 different retimer cases depending on:
1. covering versus uncovering
2. the sign of the foreground FG velocity
3. on which side of the velocity edge $X_E$ the foreground FG is. This is shown in FIG. 4 in which as an example α=0.5 for the intermediate image.

Figure 4:
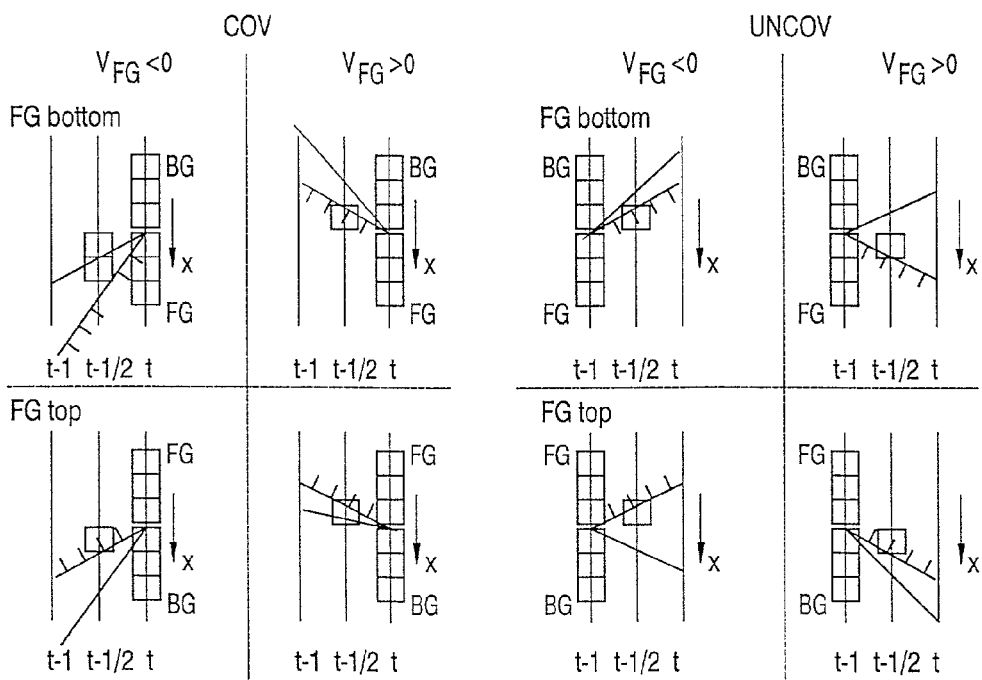
FIG. 4 illustrates retimer cases.

The first upper part of FIG. 4 relates to the situation of covering, foreground FG at the bottom of the edge and foreground FG velocity $V_{FG}<0$. In this situation two blocks foreground FG should be replaced by backgrounds BG blocks (fill BG). The second upper part of FIG. 4 relates to covering, foreground FG velocity $V_{FG}>0$ and foreground FG at the bottom side of the edge. Only one background BG block should be replaced by a foreground FG block (fill foreground FG). The third upper part of FIG. 4 relates to uncovering, foreground velocity $V_{FG}<0$ and foreground FG at the bottom side of the edge. In this case only one background BG block should be replaced by one foreground FG block (fill foreground FG). The fourth upper part of FIG. 4 relates to uncovering, foreground velocity $V_{FG}>0$ and foreground FG at the bottom side of the edge. In this case only one foreground FG block should be replaced by a background BG block (fill background BG). The first lower part of FIG. 4 relates to covering, foreground FG velocity $V_{FG}<0$ and background BG at the bottom side of the edge. Only one background BG block should be replaced by a foreground FG block (fill foreground FG). The second lower part of FIG. 4 relates to covering, foreground velocity $V_{FG}>0$ and background BG at the bottom side of the edge. Only one foreground FG block should be replaced by a background BG block (fill background BG). The third lower part of FIG. 4 relates to uncovering, foreground velocity $V_{FG}<0$ and foreground FG at the upper side of the edge. In this case one foreground FG block should be replaced by background BG block (fill background BG). The fourth lower part of FIG. 4 relates to uncovering, foreground FG at the top side of the edge and foreground velocity $V_{FG}>0$. In this case one background BG block should be replaced by a foreground FG block (fill foreground FG). Please note that in the example of FIG. 4 the intermediate image is at n+½, but it is clear that the intermediate image could be at a distance α from the previous image in which α could be varied.

The retimer needs to know which velocity around an object edge is foreground and which is background. With the aid of a previous motion vector field it could be determined which object regions or velocities belong to the foreground and which to the background. A background block is a block for which both the grey value pixels and the associated velocity vector disappear under covering. The correspondence of the vectors in foreground/background detectors are used, since they are judged to yield simpler, more reliable measures than pixel based measures.

Figure 5:
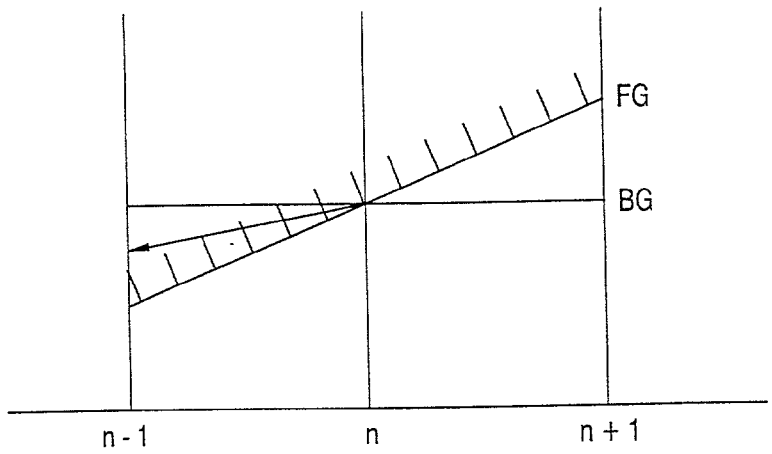
FIG. 5 illustrates an embodiment of a method for detecting foreground/background.

In a first strategy shown in FIG. 5, the average vector foreground/background determination, we make use of the fact that any vector $v_{fetch} = k\vec{v}_{FG} + (1-k)\vec{v}_{BG}$, where k is smaller than 1 and $\vec{v}_{FG}$ and $\vec{v}_{BG}$ are the velocities of the foreground and background objects at position $\vec{x}$, fetches a background velocity from the previous vector field in the case of covering and a foreground velocity in the case of uncovering. The safest vector to use is the average vector $\vec{v}_{av} = 0.5\ \vec{v}_{FG} + 0.5\ \vec{V}_{BG}$. More formally, for covering we calculate the two possible $\vec{x}_a$ and $\vec{x}_b$ of the edge in the previous image pair, e.g. for covering and a vertical edge at position $\vec{x}_E$ in vector field n:

$$\vec{x}_a = \vec{x}_E + \vec{D}\left(\vec{x} - \begin{pmatrix}1\\0\end{pmatrix}, n\right) \quad (10)$$

$$\vec{x}_b = \vec{x}_E + \vec{D}\left(\vec{x} + \begin{pmatrix}1\\0\end{pmatrix}, n\right)$$

and fetch the vector present at an intermediate position in the previous vector field (covering) in the ambiguous area:

$$\vec{D}_a(\vec{x}, n) = \vec{D}\left(\frac{\vec{x}_a + \vec{x}_b}{2}, n-1\right) \quad (11)$$

If we need to fill in the foreground vector in the ambiguous area of the interpolation vector field, we choose between $\vec{x}_a$ and $\vec{x}_b$ the one which is most different from $\vec{D}_a(\vec{x}, n)$.

A variant of this first strategy fetches the background vector from the future for uncovering:

$$\vec{D}_a(\vec{x}, n) = \vec{D}\left(\frac{\vec{x}_a + \vec{x}_b}{2}, n\right) \quad (12)$$

with:

$$\vec{x}_a = \vec{x}_1 - \vec{D}\left(\vec{x} - \begin{pmatrix}1\\0\end{pmatrix}, n-1\right) \vec{x}_b = \vec{x}_1 - \vec{D}\left(\vec{x} + \begin{pmatrix}1\\0\end{pmatrix}, n-1\right) \quad (13)$$

Figure 6:
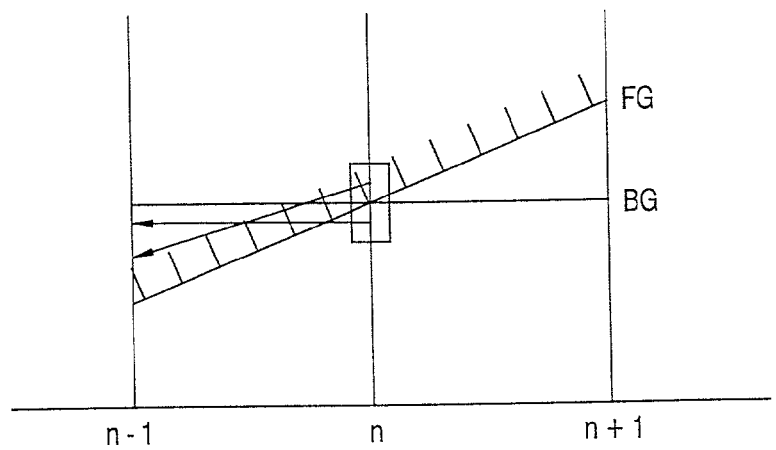
FIG. 6 illustrates another embodiment of a method for detecting foreground/background.

A second strategy (see FIG. 6), the twosided self speed foreground/background determination, uses the fact that for uncovering, positions projected to the past with the background velocity have a higher probability of crossing towards the foreground region than when they are projected with $\vec{v}_{av}$. This is interesting when small relative velocities $\vec{v}_{FG} - \vec{v}_{BG}$ or inaccurately estimated vector fields occur.

Because we do not know a priori which velocity is the background velocity, we project the two positions on either side of the edge with its own velocity $v_{self}$ (see FIG. 3). As we can see for the ideal case, the lower velocity changes from the background velocity at n to the foreground velocity at n−1. The probability that a block in foreground in n projects to foreground in n−1 is so high that for practical reasons we can consider it to be 1. All the other probable decisions are shown in table 1.

TABLE 1

| Upper block is in reality: | foreground | background |
|---|---|---|
| Decision for upper block | FG | FG or BG |
| Decision for lower block | FG or BG | FG |

In case the two projections yield the same (foreground) vector, we have a certain determination. If this vector equals the vector of the upper block, this vector is the foreground velocity vector and vice versa. In case the vectors are different, the method was unsuccessful, and yields an uncertain determination. A similar projection towards the future can be applied for the case of covering.

Figure 7:
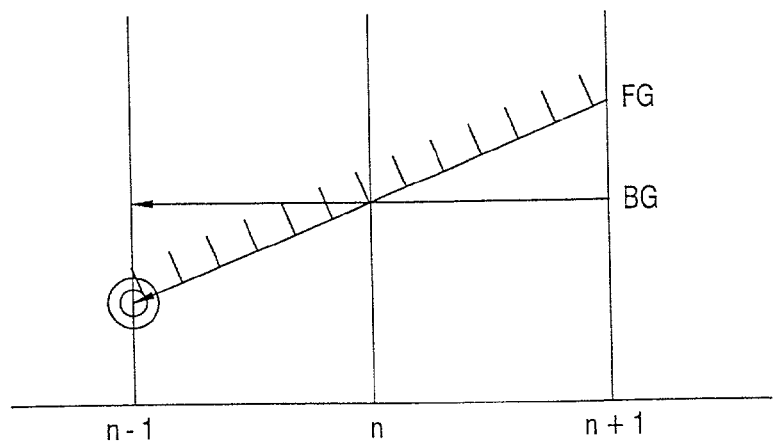
FIG. 7 shows a further embodiment of a method for detecting foreground background.

A third strategy (see FIG. 7), the edge projection foreground/background determination, checks for e.g. covering whether the edge between $\vec{v}_{FG}$ and $\vec{v}_{BG}$ in the previous image n is present at position a or b (see FIG. 2). If the edge is detected at position $$a, v_{FG} = \vec{D}\left(\vec{x} - \begin{pmatrix}1\\0\end{pmatrix}, n \pm 1\right)$$

and vice versa. Care should be taken that the velocities in n−1 are the same velocities as in n, since other velocity edges can occur in the vicinity of the projection. Obviously again the principle can be applied by substituting uncovering for covering and the future for the past.

It should be noted that the strategies can be enhanced by incorporating the match errors. In case a crossing to the foreground region occurred, the match errors of the vector in that block should be low. In case we project to a background region that was erroneously allotted a foreground vector in the previous image, the errors should be higher.

Figure 8:
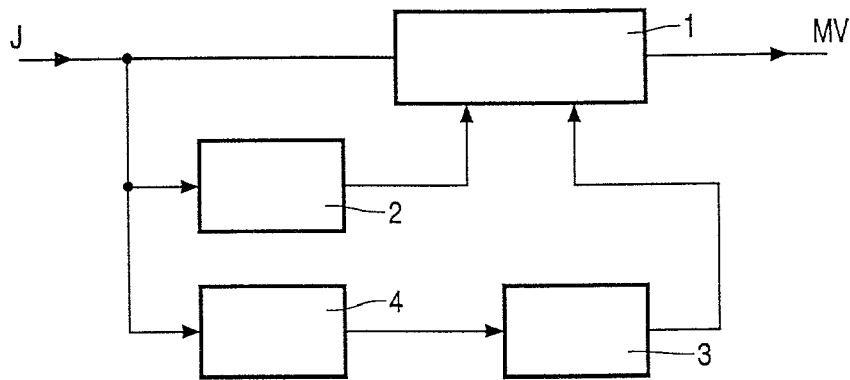
FIG. 8 illustrates a preferred embodiment of an apparatus for detecting motion.

In FIG. 8 an apparatus for detecting motion at a temporal intermediate position between previous and next images according to an embodiment of the invention is shown. This apparatus comprises means 1 for optimising a criterion function for candidate vectors, which function depends on data from both previous and next images. Such an optimising means could be implemented as described in the article "True Motion Estimation with 3-D Recursive Search Block-Matching" of G. de Haan, P. W. A. C. Biezen, H. Huygen and O. A. Ojo, published in IEEE Tr. on Circuits and Systems for Video Technology, vol. 3, October 1993, pages 368–388. To the input of the means 1 for optimising a criterion function for candidate vectors an image signal J is applied, while at the output of means 1 a motion vector MV could be derived.

Said image signal E is also supplied to means 2 for detecting covering/uncovering areas, the output of which is connected to the means 1 for optimising a criterion function for candidate vectors. Said means 2 for detecting covering/uncovering areas is for example disclosed in WO 00/1863.

The means 1 for optimising a criterion function for candidate vectors is provided with switching means controlled by means 2 for detecting covering/uncovering areas such, that the optimising by means 1 is carried out at the temporal intermediate position in non-covering and non-uncovering areas, whereas the optimising is carried out at the temporal position of the next image in covering areas and at the temporal position of the previous image in uncovering areas.

The previous image is shifted over a fraction α times the candidate vector and the next image is shifted over 1−α times the candidate vector and the fraction α may change within the image period. The above-mentioned criterion function is a match error which is minimised. Said match error is also a function of the fraction α.

The means for optimising the match error is arranged such that the fraction α is controlled by a covering/uncovering detector in the matching process. Preferable the fraction α is set to 1 in case of covering and set to 0 in case of uncovering.

The means 2 for detection covering/uncovering areas decides preferably on data in a previous image to the fraction α in the current estimation.

The image signal J is also applied to the foreground/background detector 4 the output of which controls the retimer 3. The output of the retimer 3 is connected to the means 1 for optimising the criterion function.

The retimer 3 determines a velocity edge $X_E$ in the image signal and marks an occlusion area around said edge. The retimer 3 controls the means 1 for optimising such that in said occlusion area a foreground velocity is replaced by a background velocity or reversibly dependent on the occlusion is a covering or uncovering area, the sign of the foreground velocity and on which side of the velocity edge $X_E$ foreground is.

Figure 9:
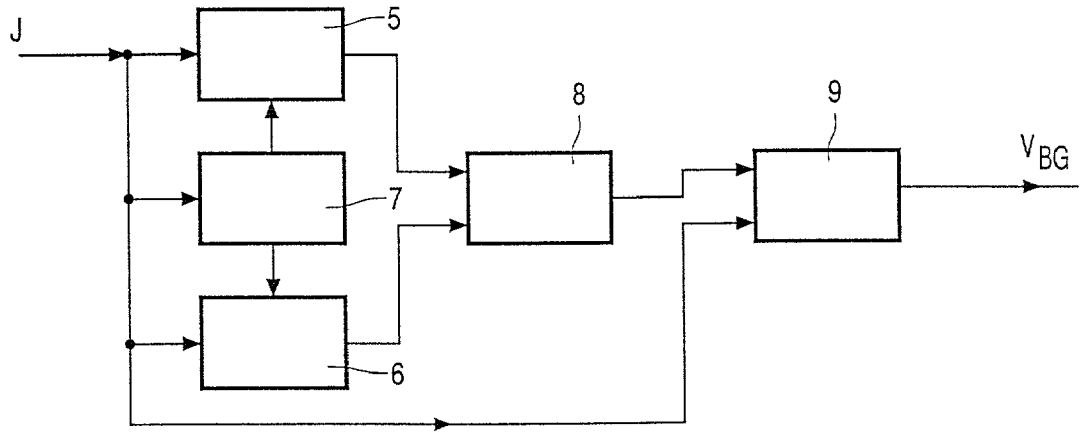
FIG. 9 illustrates an embodiment of a foreground/background detector.

In FIG. 9 an embodiment of a foreground/background detector according to the invention is shown. This detector comprises calculating means 5 and 6 to which the image signal J is supplied for carrying out a calculation at a position $\vec{x}_1$ of a velocity edge. The calculating means 5 calculates a first position $\vec{x}_\alpha$ in the previous (covering) or next (uncovering) image by shifting $\vec{x}_1$ over the first vector at one side of the edge, while the calculating means 6 calculates a second position $\vec{x}_b$ in the previous (covering) or next (uncovering) image by shifting $\vec{x}_1$ over the second vector at the other side of the edge. The choice between previous and next images is carried out by a covering/uncovering detector 7, while it is clear that for this detector the means 2 for detecting covering and uncovering areas 2 of FIG. 1 could be used.

The outputs of the calculating means 5 and 6 are connected to the inputs of calculating means 8, which calculates a third intermediate position between $\vec{x}_\alpha$ and $\vec{x}_b$.

The foreground/background detector of FIG. 9 is further provided with fetching means 9, one input of which is connected to the output of means 8 for calculating the third position, while to the other input of which the image signal J is supplied. From the output of the fetching means 9 the background velocity $V_{BG}$ could be derived. The fetching means 9 fetches with the velocity at the third position the background vector from the previous (covering) or next (uncovering) image. This vector is filled in those regions of the image in the environment of the edge, to which no vector is projected, in case the background vector $v_{\vec{F}G}$ should be filled in and the vector chosen between $$\vec{D}\left(\vec{x}-\begin{pmatrix}1\\0\end{pmatrix}, n\right) \text{ and } \vec{D}\left(\vec{x}+\begin{pmatrix}1\\0\end{pmatrix}, n\right)$$

which is most different from $v_{\vec{\alpha}\nu}$ is filled in, in case a foreground vector $v_{\vec{F}G}$ should be filled in. According to a further elaboration the third intermedidate position is ($\vec{x}_\alpha + \vec{x}_b$)/2.

Figure 10:
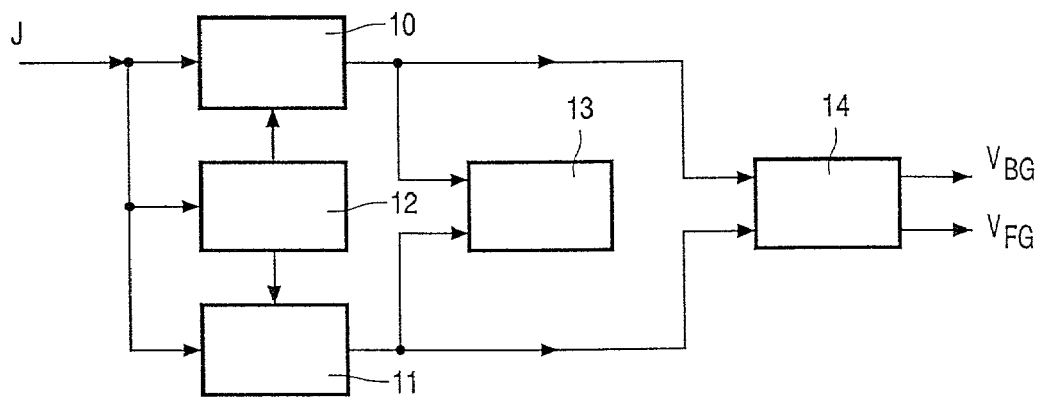
FIG. 10 illustrates another embodiment of a foreground/background detector.

Another embodiment of a foreground/background detector is shown in FIG. 10. This detector comprises projecting means 10, 11 to the input of which an image signal J is supplied. These projecting means 10, 11 are controlled by a covering/uncovering detector 12 to which also the image signal J is supplied. Said detector 12 could be substituted by the means 2 for detecting covering and uncovering areas shown in FIG. 1. The control operation of the covering/uncovering detection is such that the projecting means 10 projects one position at one side of the velocity edge to the previous (covering) or next (uncovering) image, while the projecting means 11 projects the position of the other side of the velocity edge to the previous (covering) or next (uncovering) image. Identification means 14 is connected to the projecting means 10 and 11, at the output of which the background velocity $V_{\vec{B}G}$ and the foreground velocity $V_{\vec{F}G}$ could be derived. This identification means 14 identifies a background velocity as a velocity which crosses the velocity discontinuity and projects to a foreground velocity in the previous picture, whereas a foreground velocity projects to itself.

Preferably a checking means 13 is connected to a projecting means 10 and 11, which means checks if the two projections yield the same vector. If so, the identification is certain.

Figure 11:
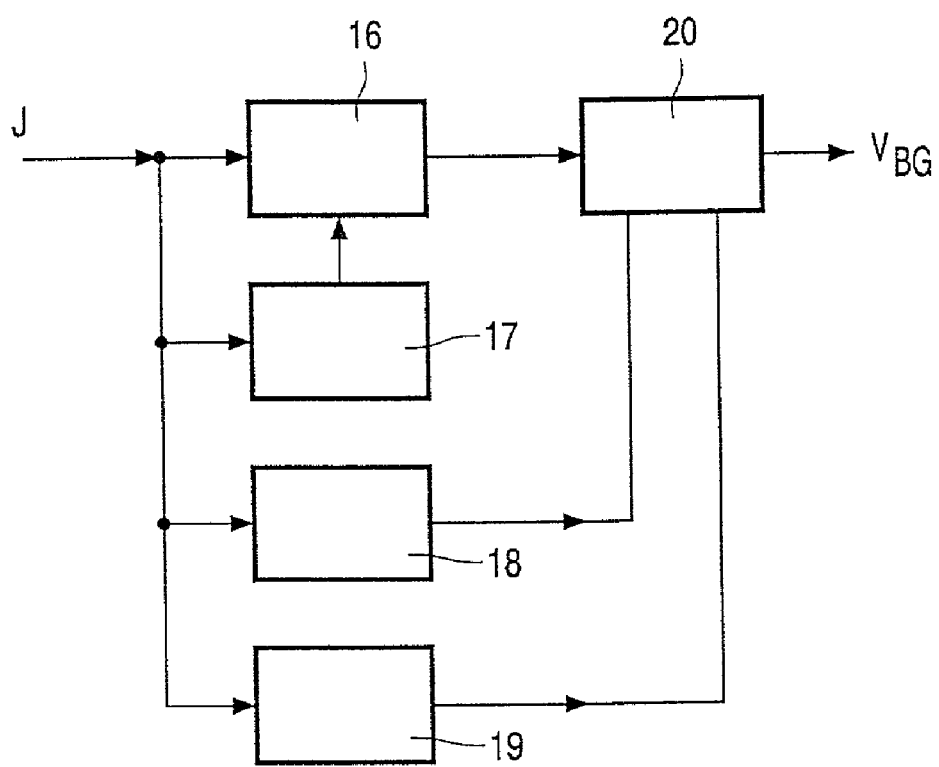
FIG. 11 illustrates a further embodiment of a foreground/background detector and FIG. 12 illustrates an image display apparatus in which the invention is incorporated.

In FIG. 11 a further embodiment of a foreground/background detector is shown. This detector is also controlled by a covering/uncovering detector 17, which also could be substituted by the means 2 for detection of covering and uncovering areas of FIG. 1. In the detector of FIG. 11 an image signal J is supplied to the input of a projecting means 16, which under the control of the covering/uncovering detector projects the discontinuity to the previous vector filled in the covering situation and to the future vector field in the uncovering situation. Furthermore, means 18 for determining the velocity on one side of the discontinuity and means 19 for determining the velocity on the other side of the discontinuity are provided. The determined velocities are supplied to testing means 20 from the output of means 18 and 19. Said testing means 20 is connected to the projecting means 16 for testing whether the edge has moved over the first vector on one side of the discontinuity or over the second vector on the other side of the discontinuity. The testing means 20 delivers the background vector $V_{\vec{B}G}$, which background vector is the second (first) vector in case the discontinuity moves with the first (second) vector.

Furthermore filling means could be connected to the testing means 20, which filling means fills the first (second) vector in those regions of the projected vector field in the environment of the discontinuity, to which no vector is projected, in case a foreground vector should be filled in and the other vector is filled in, in case a background vector should be filled.

Figure 12:
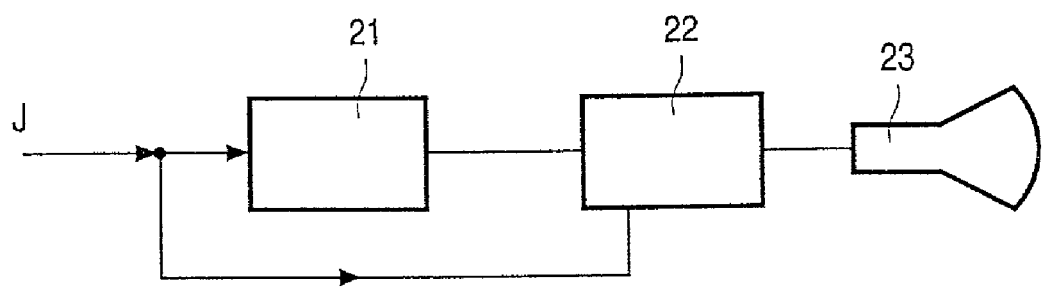

In FIG. 12 an image display apparatus is shown. This apparatus comprises an apparatus 21 for detection a motion vector at a temporal intermediate position between previous and next images. An image signal J is supplied to the apparatus 21 and also to means 22 for interpolating image parts between previous and next images. The detected motion vectors at the output of the apparatus 21 are supplied to the input of interpolating means 22. The output of the interpolating means 22 is applied to a cathode ray tube 23. The apparatus for detecting a motion vector could be implemented according to one of the above described apparatus.

The invention claimed is:

1. A method for detecting motion at a temporal intermediate position between previous and next images, in which a criterion function for candidate vectors is optimized, said function depending on data from both previous and next images and in which the optimizing is carried out at the temporal intermediate position in non-covering and non-uncovering areas, characterized in that the optimizing is carried out at the temporal position of the next image in covering areas and at the temporal position of the previous image in uncovering areas.

2. The method as claimed in claim 1, wherein the previous image is shifted over a fraction $\alpha$ times the candidate vector, the next image is shifted over $1-\alpha$ times the candidate vector and the fraction $\alpha$ may change within the image period.

3. The method as claimed in claim 1, wherein the criterion function is a match error which is minimized.

4. The method as claimed in claim 2, wherein the fraction $\alpha$ is controlled by a covering/uncovering detector in the matching process.

5. The method as claimed in claim 4, wherein the fraction $\alpha$ is set to 1 in case of covering and set to 0 in case of uncovering.

6. The method as claimed in claim 4, wherein the covering/uncovering detector decides on data in a previous image to the fraction $\alpha$ in the current estimation.

7. The method as claimed in claim 1, wherein a velocity edge $X_E$ is determined, an occlusion area is marked around said edge, and in said occlusion area, foreground velocity is replaced by background velocity or reversibly dependent on whether the occlusion area is a covering or uncovering area, the sign of the foreground velocity and on which side of the velocity edge $X_E$ the foreground is.

8. The method as claimed in claim 7, wherein at the position $\vec{x}_1$ of a velocity edge

- a first position $\vec{x}_a$ in the previous (covering) or next (uncovering) image is calculated by shifting $\vec{x}_1$ over the first vector at one side of the edge
- a second position $\vec{x}_b$ in the previous (covering) or next (uncovering) image is calculated by shifting $\vec{x}_1$ over the second vector at the other side of the edge
- and a third intermediate position between $\vec{x}_a$ and $\vec{x}_b$ is calculated
- while finally, the vector fetched with $v_{\vec{a}_v}$ at the third position in the previous (covering) or next (uncovering) image is filled in those regions of the image in the environment of the edge, to which no vector is projected, in case the background vector $v_{\vec{B}G}$ should be filled in, and the vector chosen between $$\vec{D}\left(\vec{x} - \begin{pmatrix}1\\0\end{pmatrix}, n\right)$$

and $$\vec{D}\left(\vec{x} + \begin{pmatrix}1\\0\end{pmatrix}, n\right)$$

which is most different from $v_{\vec{a}_v}$ is filled in, in case a foreground vector $v_{\vec{F}G}$ should be filled in.

9. The method as claimed in claim 8, wherein the intermediate position is $(\vec{x}_a + \vec{x}_b)/2$.

10. The method as claimed in claim 7, wherein a background velocity is identified as a velocity which crosses the velocity discontinuity and projects to a foreground velocity in the previous picture, whereas a foreground velocity projects to itself.

11. The method as claimed in claim 7, wherein near edges it is tested whether the mentioned edge has moved over the first vector on one side of the edge, or over the second vector on the other side of the edge, in case the edge moves with the first (second) vector, the second (first) vector is filled in those regions of the projected vector field in the environment of the edge, to which no vector is projected, in case a background vector $v_{\vec{B}G}$ should be filled in, and the other vector is filled in, in case a foreground vector $v_{\vec{F}G}$ should be filled.

12. The method as claimed in claim 10, wherein the crossing from a background region to a foreground region in the previous image is verified by the match error of the vector in that block.

13. An apparatus for detecting motion at a temporal intermediate position between previous and next images, comprising means for optimizing a criterion function for candidate vectors, said function depending on data from both previous and next images in which the optimizing is carried out at the temporal intermediate position in non-covering and non-uncovering areas, characterized in that said apparatus further comprises means for detecting covering or uncovering areas, wherein the optimizing is carried out at the temporal position of the next image in covering areas and at the temporal position of the previous image in uncovering areas.

14. The apparatus as claimed in claim 13, wherein the previous image is shifted over a fraction $\alpha$ times the candidate vector, the next image is shifted over $1-\alpha$ times the candidate vector and the fraction $\alpha$ may change within the image period.

15. The apparatus as claimed in claim 13, wherein the criterion function is a match error which is minimized.

16. The apparatus as claimed in claim 14, wherein said apparatus further comprises a covering/uncovering detector for controlling the fraction $\alpha$ in the matching process.

17. The apparatus as claimed in claim 16, wherein the fraction $\alpha$ is set to 1 in case of covering and set to 0 in case of uncovering.

18. The apparatus as claimed in claim 16, wherein the covering/uncovering detector decides on data in a previous image to the fraction $\alpha$ in the current estimation.

19. The apparatus as claimed in claim 13, wherein a velocity edge $X_E$ is determined, an occlusion area is marked around said edge, and in said occlusion area, foreground velocity is replaced by background velocity or reversibly dependent on whether the occlusion area is a covering or uncovering area, the sign of the foreground velocity and on which side of the velocity edge $X_E$ the foreground is.

20. The apparatus as claimed in claim 19, wherein said apparatus further comprises calculation means for, at the position $\vec{x}_1$ of a velocity edge, calculating a first position $\vec{x}_a$ in the previous (covering) or next (uncovering) image by shifting $\vec{x}_1$ over the first vector at one side of the edge a second position $\vec{x}_b$ in the previous (covering) or next (uncovering) image by shifting $\vec{x}_1$ over the second vector at the other side of the edge and a third intermediate position between $\vec{x}_a$ and $\vec{x}_b$, while finally, the vector fetched with $v_{\vec{a}v}$ at the third position in the previous (covering) or next (uncovering) image (9) is filled in those regions of the image in the environment of the edge, to which no vector is projected, in case the background vector $v_{\vec{B}G}$ should be filled in, and the vector chosen between $$\vec{D}\!\left(\vec{x}-\begin{pmatrix}1\\0\end{pmatrix},n\right) \text{ and } \vec{D}\!\left(\vec{x}+\begin{pmatrix}1\\0\end{pmatrix},n\right)$$

and $$\vec{D}\!\left(\vec{x}+\begin{pmatrix}1\\0\end{pmatrix},n\right)$$

which is most different from $v_{\vec{a}v}$ is filled in, in case a foreground vector $v_{\vec{F}G}$ should be filled in.

21. The apparatus as claimed in claim 20, wherein the intermediate position is $(\vec{x}_a+\vec{x}_b)/2$.

22. The apparatus as claimed in claim 19, wherein said apparatus further comprises means for projecting two positions on either side of the edge to the previous (covering) or next (uncovering) image, in which a background velocity is identified as a velocity which crosses the velocity discontinuity and projects to a foreground velocity in the previous picture, whereas a foreground velocity projects to itself.

23. The apparatus as claimed in claim 19, wherein said apparatus further comprises means for testing near edges whether the mentioned edge has moved over the first vector on one side of the edge, or over the second vector on the other side of the edge, in case the edge moves with the first (second) vector, the second (first) vector is filled in those regions of the projected vector field in the environment of the edge, to which no vector is projected, in case a background vector $v_{\vec{B}G}$ should be filled in, and the other vector is filled in, in case a foreground vector $v_{\vec{F}G}$ should be filled.

24. The apparatus as claimed in claim 22, wherein said apparatus further comprises verification means for verifying the crossing from a background region to a foreground region in the previous image by the match error of the vector in that block.

25. An image display apparatus comprising apparatus for detecting a motion vector as claimed in claim 13, means for interpolating image parts connected to said detecting apparatus, and a display device connected to the interpolating means.

* * * * *